United States Patent

Howick

[15] 3,702,048
[45] Nov. 7, 1972

[54] AIR WASHER
[72] Inventor: Stanley O. Howick, 8120 Barnsbury, Union Lake, Mich. 48085
[22] Filed: March 10, 1971
[21] Appl. No.: 122,932

[52] U.S. Cl. ................55/238, 55/239, 55/241, 55/257, 55/260, 55/418, 261/79 A
[51] Int. Cl. ............................................B01d 50/00
[58] Field of Search.................55/92, 230, 235–239, 55/240, 241, 257, 260, 418; 261/79 A

[56] References Cited

UNITED STATES PATENTS 1,894,744  1/1933  Hawley.......................55/237
2,142,747  1/1939  Fisher......................261/79 A Primary Examiner—Bernard Nozick
Attorney—Harness, Dickey & Pierce

[57] ABSTRACT

An industrial air washer having a vertical cylindrical housing partially filled with water and a tangential air entrance with an adjustable baffle plate controlling the inlet resistance. The air enters V-shaped baffles circularly arranged around an upwardly flowing water stream which is spread by an inverted conical distributor below a circular distributor plate. V-shaped moisture eliminators and a suction fan are disposed above the baffles.

3 Claims, 2 Drawing Figures

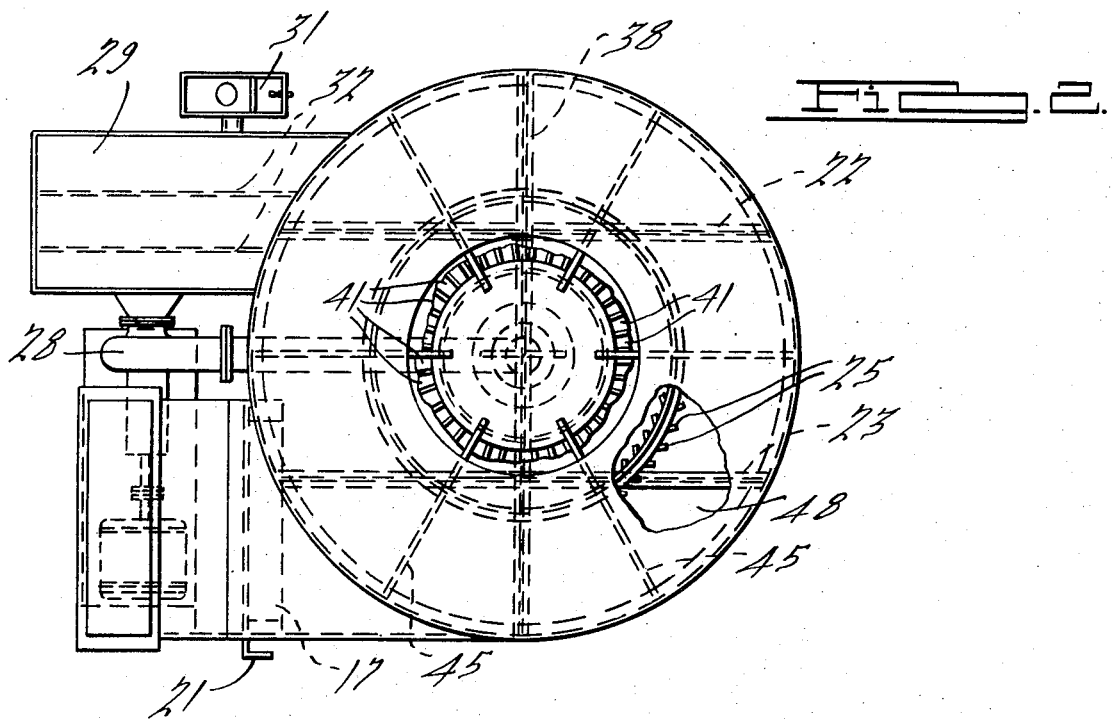
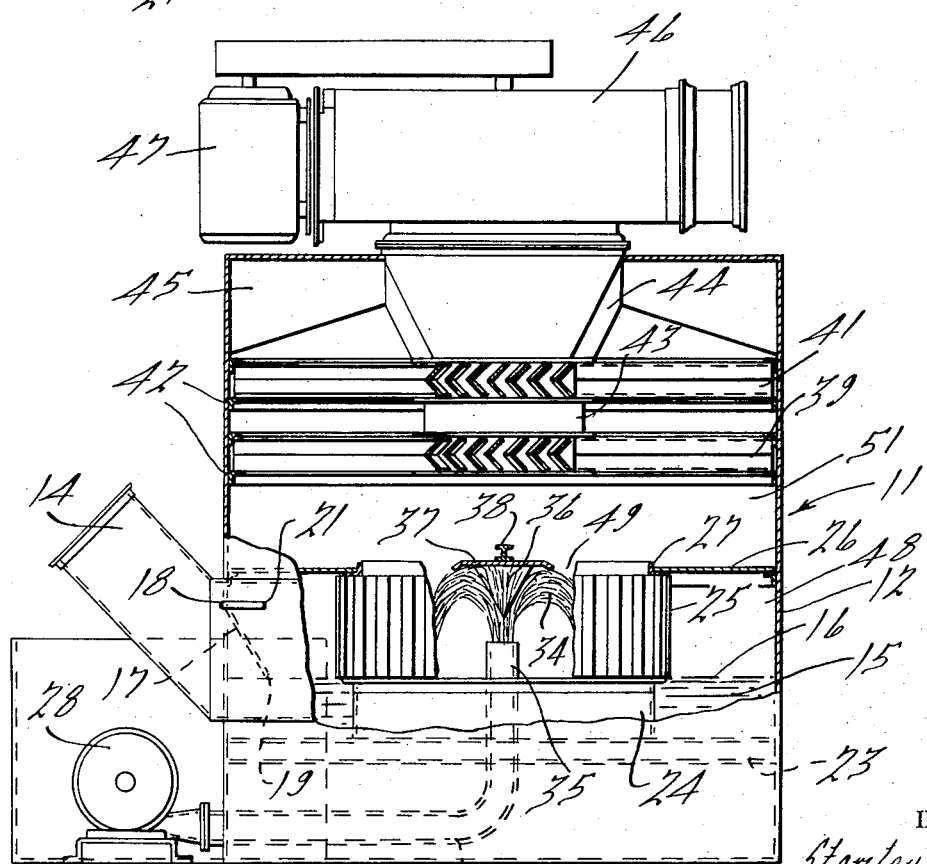

AIR WASHER

BACKGROUND OF THE INVENTION

1. Field of the Invention

The invention relates to industrial air washers of the type which remove particulate matter from ventilating systems in polishing, plating, foundry and other operations.

2. Description of the Prior Art

The closest known prior art is that shown in my U. S. application, Ser. No. 778,541, filed Nov. 28, 1968, now U.S. Pat. No. 3,557,535, issued Jan. 26, 1971. This prior air washer has circularly arranged baffles with outwardly extending horizontal baffles above them. These two sets of baffles are wet by a peripheral spray system.

SUMMARY OF THE INVENTION

The present invention not only greatly simplifies this prior construction and is thus more economical to fabricate, but the water spray arrangement is more efficient, eliminating gaps which could possibly occur with the previous arrangement. The invention comprises a tangential inlet having an adjustable baffle plate which directs the incoming air downwardly against the water surface in varying degrees. This construction permits one to adjust the flow resistance through the washer, so that the air scrubbing action may be increased by higher resistance or decreased by lower resistance.

A single set of V-shaped baffles is provided, surrounding a central water stream directed upwardly against an inverted conical distributor. This distributor, together with a dished circular distributor plate above it, will assure complete spray coverage on all the baffles. The horizontal baffles of the previous construction are eliminated, and the resultant higher air velocity through the V-shaped vertical baffles will throw off foreign particles more efficiently.

BRIEF DESCRIPTION OF THE DRAWINGS

FIG. 1 is a partially cross-sectioned view in elevation of the air washer of this invention; and FIG. 2 is a plan view thereof with parts broken away for clarity, the fan and motor being removed.

DESCRIPTION OF THE PREFERRED EMBODIMENT

The air washer is generally indicated at 11 and comprises a vertical cylindrically shaped housing 12 on a base 13 and having a tangential air inlet duct 14. During operation, the lower portion of housing 12 will be filled with water 15 to the level indicated at 16. A baffle plate 17 is pivotally mounted at 18 within the air inlet duct immediately above the water level. The distance between the lower edge 19 of plate 17 and water level 16 may be adjusted by any convenient means such as a lever 21. The air will thus be directed downwardly a greater or lesser extent against water 15. As will be later seen, this will adjust the resistance of air flow through the washer and will also control the amount of turbulence on the surface of the water, thus varying the degree of air scrubbing action.

Two parallel beams 22 and 23 are provided within housing 12, these beams supporting a vertical cylindrical member 24 which acts as a seal within water collecting pool 15 to prevent air from flowing inwardly of the seal. Member 24 supports a plurality of circumferentially spaced V-shaped baffles 25. These baffles extend vertically and are in nested relation with their outer edges facing away from the direction of air flow around the housing, so that the air will have to reverse its flow in order to go through the baffles. Both seal 24 and baffles 25 are spaced a substantial distance inwardly from housing 12, and an annular closure plate 26 extends between housing 12 and the upper ends of baffles 25, a circular reinforcing member 27 surmounting the baffles and supporting the inner end of plate 26.

Means are provided for spraying baffles 25 with water in order to constantly cover them with a water film and help entrap foreign particles carried by the air. According to the invention, this means comprises a water pump 28 taking water from a reservoir 29, the level in the reservoir being controlled by an overflow float control box 31. Screens 32 in the reservoir will protect the pump from foreign matter carried by the water. The pump delivers water under pressure to a pipe 33 passing into the lower end of housing 12 and extending upwardly in the center of the housing through seal member 24 to a point above water level 16. The water 34 under pressure will issue from exit 35 of pipe 33 onto an inverted conically shaped distributor 36, the upper end of which is approximately at the level of the upper ends of baffles 25. Distributor 36 is secured to the underside of a dished circular distributor plate 37, this plate extending outwardly from distributor 36. Both the distributor and distributor plate are supported by a beam 38 extending across the inside of housing 12.

First and second series of moisture eliminator baffles 39 and 41 are mounted above baffles 25. Each set of moisture eliminator baffles comprises a horizontally extending set of nested V-shaped members, the outer ends of these members being supported by annular supports 42 and the inner ends by a shroud 43. This shroud is of vertically arranged cylindrical shape, and is secured to an upper plate 44 which in turn is supported by radial gussets 45. A fan 46 is supported on plate 44 and a motor 47 is provided for driving the fan, which will draw air upwardly through the moisture eliminator baffles and discharge the cleaned air from unit 11.

In operation, motor 47 and pump 28 will be operated, and air to be cleaned will be drawn into conduit 14. The air will be deflected downwardly by baffle 17 and will strike the surface 16 of water collecting pool 15 with a force depending upon the angular setting of baffle 17. This will create a certain amount of turbulence, the water particles serving to take out some of the foreign particles entrained in the air.

The air will then circulate counter clockwise within chamber 48 of housing 12 as seen in FIG. 2 and will pass radially inwardly through V-shaped baffles 25. The surfaces of these baffles will be continuously wet by the spray from distributor 36 and distributor plate 37. The rapid reversal of air flow will entrap more foreign particles and serve to clean the air.

The air will then flow upwardly through the opening 49 between member 27 and distributor plate 37 and will enter the chamber 51 below the first set of moisture eliminator baffles 39. The air will rise through the first and second sets of moisture eliminator baffles which will remove some of the entrained water particles, and will then be discharged upwardly through fan 46.

It will be observed that the air motion through baffles 25 will not be such as to disturb or break up the water spray pattern created by distributor 36 and distributor plate 37, so that the baffles will be constantly covered by a film of water. It should also be noted that the impingement of incoming air on the surface 16 of water collecting pool 15, created by inlet baffle 17, will serve to create a secondary water spray pattern. In the event that water pump 28 should become disabled, this secondary spray pattern would still create an air washing effect.

What is claimed is:

1. In an air washer, a vertical cylindrical housing, a water collection pool in the lower portion of said housing, a tangential air inlet above said collection pool, an inlet baffle plate mounted in said inlet and adjustable to vary the degree to which inlet air is deflected downwardly against the surface of the collection pool, an annular water seal spaced inwardly from said housing and extending into said pool, a set of circularly arranged vertical impingement baffles defining openings therebetween extending from and positioned above said seal, an annular plate extending between the upper ends of said impingement baffles and the housing whereby air will flow radially inwardly through said impingement baffles, means for maintaining a constant spray film of water on said impingement baffles comprising a pipe extending into said housing and upwardly through the center of said seal, the upper end of said pipe being centrally located within said impingement baffles, means for supplying water under pressure into said pipe, an inverted conically shaped distributor mounted above the exit of said pipe, a dished distributor plate above said distributor and extending outwardly therefrom, whereby water issuing from said pipe will be deflected radially outwardly and downwardly by said distributor and distributor plate onto said impingement baffles, an annular opening being formed between said distributor plate and said first-mentioned plate so that the air flowing through said impingement baffles will pass upwardly therethrough, moisture eliminator baffles in said housing above said annular opening, and a fan above said moisture eliminator baffles drawing air through said housing and discharging the air therefrom.

2. The combination according to claim 1, said impingement baffles being of V-shaped nested construction.

3. The combination according to claim 2, there being two sets of moisture eliminator baffles in series, each set being of V-shaped nested construction.

* * * * *